(12) United States Patent  
Tian (10) Patent No.: US 10,472,064 B2  
(45) Date of Patent: Nov. 12, 2019

(54) VTOL FIXED-WING AERIAL DRONE WITH INTERCHANGEABLE CABINS

(71) Applicant: Yu Tian, Hong Kong (HK)

(72) Inventor: Yu Tian, Hong Kong (HK)

(*) Notice: Subject to any disclaimer, the term of this patent is extended or adjusted under 35 U.S.C. 154(b) by 0 days.

(21) Appl. No.: 15/950,123

(22) Filed: Apr. 10, 2018

(65) Prior Publication Data

US 2019/0233107 A1 Aug. 1, 2019

Related U.S. Application Data

(60) Provisional application No. 62/623,413, filed on Jan. 29, 2018.

(51) Int. Cl.

| | | |
|---|---|---|
| *B64C 39/12* | (2006.01) | |
| *B64C 39/04* | (2006.01) | |
| *B64C 39/02* | (2006.01) | |
| *B64C 39/08* | (2006.01) | |
| *B64C 11/46* | (2006.01) | |
| *B64C 29/00* | (2006.01) | |

(52) U.S. Cl.
CPC ............ *B64C 39/12* (2013.01); *B64C 39/024* (2013.01); *B64C 39/04* (2013.01); *B64C 39/08* (2013.01); *B64C 11/46* (2013.01); *B64C 29/0025* (2013.01); *B64C 2201/088* (2013.01); *B64C 2211/00* (2013.01)

(58) Field of Classification Search
CPC . B64C 29/0016; B64C 29/0025; B64C 39/08; B64C 39/12; B64C 2201/108; B64C 2201/162; B64C 2201/165
See application file for complete search history.

(56) References Cited

U.S. PATENT DOCUMENTS

| 5,145,129 A * | 9/1992 | Gebhard | ................. B64C 29/00 244/12.1 |
|---|---|---|---|
| 5,863,013 A * | 1/1999 | Schmittle | ................. B64C 3/385 244/104 LS |
| 2003/0066932 A1* | 4/2003 | Carroll | .................. B64C 39/024 244/120 |
| 2018/0305005 A1* | 10/2018 | Parks | ...................... B64C 27/26 |
| 2019/0047342 A1* | 2/2019 | Dietrich | .................. B60F 5/02 |
| 2019/0127056 A1* | 5/2019 | Weekes | .................. B64C 27/08 |

* cited by examiner

*Primary Examiner* — Nicholas McFall (74) *Attorney, Agent, or Firm* — WPAT, P.C., Intellectual Property Attorneys; Anthony King (57) ABSTRACT

An aerial drone having a flying platform with a canard configuration and has detachable and interchangeable cabins.

10 Claims, 13 Drawing Sheets

VTOL FIXED-WING AERIAL DRONE WITH INTERCHANGEABLE CABINS

CROSS-REFERENCE TO RELATED APPLICATIONS

This application claims priority to U.S. Provisional Pat. No. 62/623,413, filed on Jan. 29, 2018, which is hereby incorporated by reference in its entirety.

FIELD OF THE DISCLOSURE

The present disclosure relates to a vertical takeoff and landing (VTOL) aerial drone, and more particularly, a VTOL flying platform having interchangeable and detachable cabins.

BACKGROUND OF THE DISCLOSURE

Generally, some aerial drones are known to carry people, and some aerial drones are known to carry cargo. Each of these two types of drones has its unique challenges to perform effectively and efficiently.

There is a continuing need for new ways to carry people and/or cargo effectively and efficiently.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a VTOL (vertical take-off and landing) aerial drone is contemplated to include interchangeable cabins.

In one aspect combinable with the general implementation, the aerial drone can have a flying platform.

In another aspect combinable with the general implementation, the flying platform can have a left main wing and a right main wing.

In another aspect combinable with the general implementation, the flying platform can have a left canard wing and a right canard wing.

In yet another aspect combinable with the general implementation, the flying platform can have a main body disposed between the left main wing and the right main wing.

In still another aspect combinable with the general implementation, the flying platform can have a left linear support connecting the left main wing to the left canard wing, a right linear support connecting the right main wing to the right canard wing.

In another aspect combinable with the general implementation, the left linear support can have a first, a second, a third lifting propellers, the right linear support can have a fourth, a fifth, a sixth lifting propellers In another aspect combinable with the general implementation, the flying platform can have at least one vertical stabilizer.

In another aspect combinable with the general implementation, the flying platform can have at least two vertical stabilizers, each of which can be disposed at the rear end of each linear support.

In another aspect combinable with the general implementation, the flying platform can have at least one pushing propeller.

In another aspect combinable with the general implementation, the aerial drone can have a cargo cabin detachably coupled to the flying platform.

In yet another aspect combinable with the general implementation, the aerial drone can have a passenger cabin detachably coupled to the flying platform.

In still another aspect combinable with the general implementation, the aerial drone can interchangeably couple to a cargo cabin and a passenger cabin.

In still yet another aspect combinable with the general implementation, the flying platform can have an energy storage unit disposed within its main body. Alternatively and optionally, there can be an energy storage unit disposed within the passenger cabin and/or the cargo cabin to supply energy to the flying platform. In this way, whenever the flying platform picks up a new cabin, its energy source/storage is also replenished.

In another aspect combinable with the general implementation, the flying platform can have a hybrid engine to produce electricity.

In yet another aspect combinable with the general implementation, each of the two linear supports can have a total of four lifting propellers attached, wherein at least two lifting propellers are disposed at the same lengthwise location on the same linear support, but on opposite sides (i.e., top side and bottom side) of the linear support.

In another aspect combinable with the general implementation, the flying platform can have a left wing-tip propeller disposed on the distal end of the left main wing, and a right wing-tip propeller disposed on the distal end of the right main wing, In yet another aspect combinable with the general implementation, wherein the pushing propeller is horizontally located at substantially the same level with the cargo cabin or the passenger cabin.

In still another aspect combinable with the general implementation, the pushing propeller can be coupled to a rear end of the main body and is extended downward via a connector so that the pushing propeller is physically away from the main body and vertically offset from the main body.

In a further aspect combinable with the general implementation, there can be a left pushing propellers disposed in a mid-section of the left vertical stabilizer, and a right pushing propeller disposed in a mid-section of the right vertical stabilizer.

In another aspect combinable with the general implementation, the flying platform can have autonomous flight functions to transport passengers and/or cargo.

In another aspect combinable with the general implementation, the passenger cabin can include user control interface allowing the passenger to control flight path, regardless of whether or not the aerial drone has autonomous flight capabilities.

In still another aspect combinable with the general implementation, the passenger cabin and/or cargo cabin can be attached to either on the top side of the flying platform, the bottom side of the flying platform, or both.

In another aspect combinable with the general implementation, the flying platform can have at least one single-blade leaf spring as a landing gear.

In a further aspect combinable with the general implementation, the flying platform can use at least one vertical stabilizer as a landing gear.

In yet another aspect combinable with the general implementation, the at least one vertical stabilizer can have a landing gear attached to its distal end.

Accordingly, the present disclosure is directed to an aerial drone that transports goods and people using detachable cabins.

Among the many possible implementations of an aerial drone, one embodiment of the aerial drone is one that has an overall flat configuration being attachable to separable passenger and/or cargo cabins. This overall flat configuration can be defined as a flying platform, a flying trellis, a flying framework, a flying scaffold, and a flying lattice work.

Further, it is contemplated that this flying platform has a canard design having two main wings and two canard wings.

Contemplated main wings can each have a wing-tip lifting propellers disposed on the distal tip of each main wing. Optionally, the wing-tip lifting propellers can be located on a vertical stabilizer or a vertical lifter which is located at the distal end of each main wing. In this way, the wing-tip lifting propeller could be somewhat position vertically away from the top surface of the main wing.

In one embodiment, within each linear support there can be a foldable leg. During flight, the foldable leg is retracted into the linear support. During vertical takeoff and landing, the foldable leg is extended to act as a landing gear, or to support a landing gear.

Another aspect of the embodiments is directed to a method of minimizing the weight of an aerial drone by using single-blade leaf spring as a landing gear. There may be more than one such single-blade leaf spring to act as landing gears. In yet another embodiment, such single-blade leaf spring can be attached to the distal end of a downward-extending vertical stabilizer, effectively using the downward-extending vertical stabilizer as a support for the landing gear.

While this specification contains many specific implementation details, these should not be construed as limitations on the scope of any inventions or of what may be claimed, but rather as descriptions of features specific to particular implementations of particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially described as such, one or more features from a described/claimed combination can in some cases be excised from the combination, and the described/claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

The following call out list of elements in the drawing can be a useful guide when referencing the elements of the drawing figures:

100 Flying transport system
101 Flying platform
102 Main body
103A Left linear support
103B Right linear support
104A Left main wing
104B Right main wing
105A Left canard wing
105B Right canard wing
106A Left vertical stabilizer
106B Right vertical stabilizer
107A Left pushing propeller
107B Right pushing propeller
108A First lifting propeller
108B Second lifting propeller 108C Third lifting propeller
108D Fourth lifting propeller
108E Fifth lifting propeller
108F Sixth lifting propeller
109A Left wing-tip propeller
109B Right wing-tip propeller
110A Left wing-tip vertical stabilizer
110B Right wing-tip vertical stabilizer
111A Left folding leg
111B Right folding leg
112A First leaf spring blade
112B Second leaf spring blade
112C Third leaf spring blade
112D Fourth leaf spring blade
116 Vertical extender
117 Center push propeller
130 Cargo cabin
135A First cabin leaf spring blade
135B Second cabin leaf spring blade
135C Third cabin leaf spring blade
135D Fourth cabin leaf spring blade
140 Passenger cabin
145A Cabin leg
145B Cabin leg
145C Cabin leg
145D Cabin leg
147 Cabin attachment catch
150 Energy storage unit in the flying platform
155 Energy storage unit in the cabin

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

Figure 1:
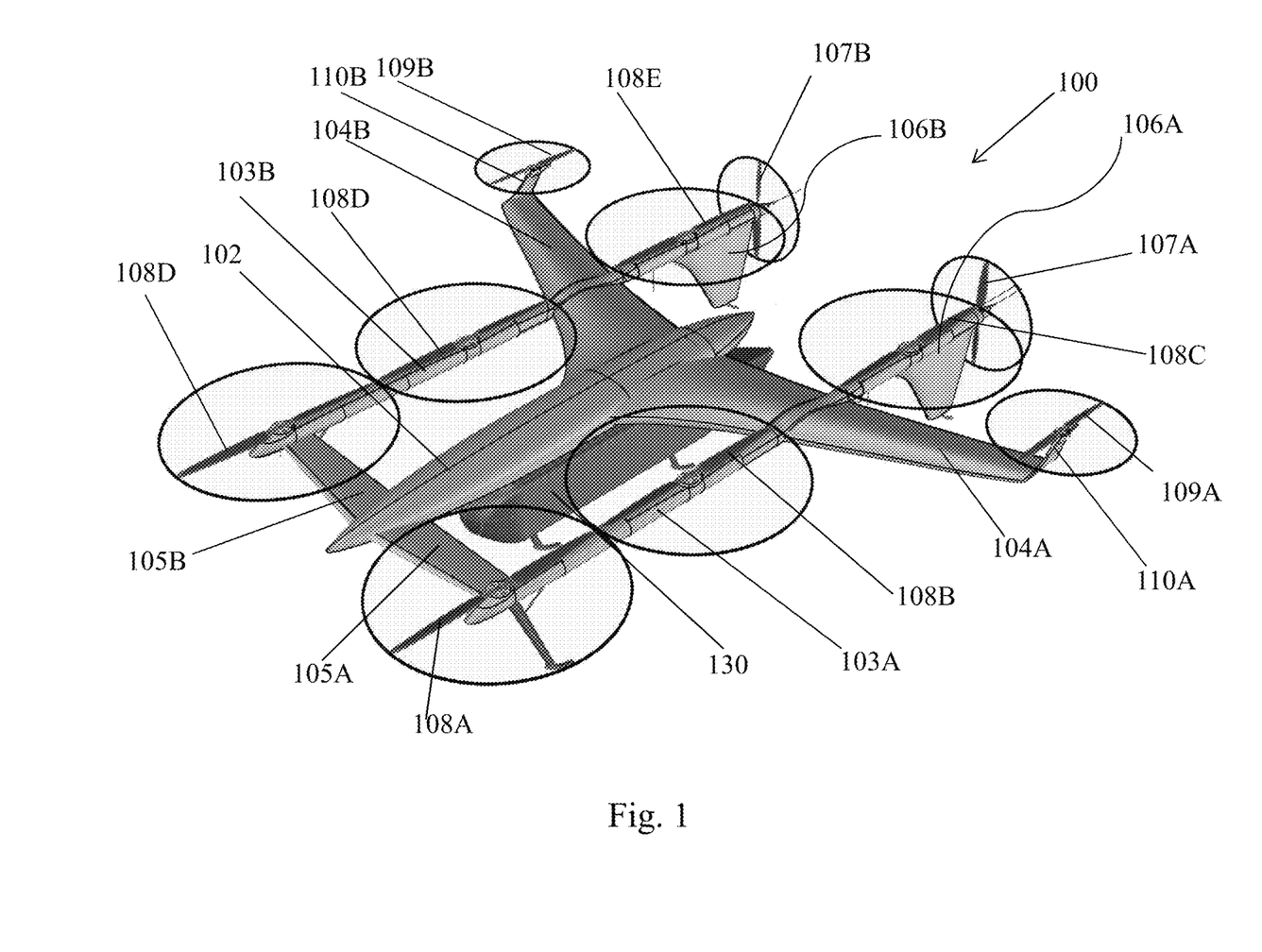
FIG. 1 is a top perspective view of an embodiment of a VTOL drone system having a flying platform and a cargo cabin detachably attached, according to an aspect of the embodiment.

FIG. 1 generally depicts an embodiment of VTOL aerial drone 100 having a canard configuration. The drone 100 can have two main wings 104A, 104B, and two canard wings 105A, 105B. The two main wings 104A, 104B and the two canard wings 105A, 105B can be attached to a main body 102, wherein the main body can be located alone a center longitudinal line of the drone 100. There can also be a left linear support 103A disposed parallel to the main body 102, and can connect the left main wing 104A to the left canard wing 105A. Similarly, there can also be a right linear support 103B disposed parallel to the main body 102, and can connect the right main wing 104B to the right canard wing 105B.

The left and right linear supports 103A, 103B are contemplated to improve the structural integrity of the drone 100. In other embodiments, the left and right linear supports 103A and 103B can house driving motors (not shown) that drives each of the lifting propellers 108A, 108B, 108C, 108D, 108E, 108F. As will to disclosed later, the left and right linear supports 103A and 103B can also house folding legs 111 each of which is retrievable within the left and right linear supports 103A and 103B.

In one embodiment, the left and right linear supports 103A, 103B are attached to the distal ends of left and right canard wings 105A, 105B, respectively. In yet another embodiment, the left and right linear supports 103A, 103B extend beyond the canard wings 105A, 105B.

In one embodiment, the left and right linear supports 103A, 103B are attached to near the mid-section of left and right main wings 104A, 104B, respectively. In yet another embodiment, the left and right linear supports 103A, 103B extend in a rearward direction beyond the main wings 104A, 104B.

The left linear support 103A is contemplated to be relatively narrow in diameter and may have a plurality of lifting propellers 108A, 108B, 108C disposed on either the top side, bottom side, or both, of the left linear support 103A. These lifting propellers 108A, 108B, 108C can be driven by low profile motors disposed within the hollow interior of the left linear support 103A. In the embodiment shown in FIG. 1, lifting propellers 108A, 108B, 108C are disposed only the top side of the left linear support 103A.

Likewise, the right linear support 103B is contemplated to be relatively narrow in diameter and may have a plurality of lifting propellers 108D, 108E, 108F disposed on either the top side, bottom side, or both, of the right linear support 103B. These lifting propellers 108D, 108E, 108F can be driven by low profile motors disposed within the hollow interior of the right linear support. In the embodiment shown in FIG. 1, lifting propellers 108D, 108E, 108F are disposed only the top side of the right linear support 103B.

The drone 100 may have at least one pushing propeller to push the drone 100 in a forward direction. In one embodiment as shown in FIG. 1, there can be two pushing propellers 107A, 107B. The two pushing propellers 107A, 107B can be disposed, respectively, on the rear distal ends of linear supports 103A, 103B.

Near the rear ends of each linear support 103A, 103B can be provided two vertical stabilizers 106A, 106B, respectively. While they are shown pointing downwards, there can also be an embodiment where they point upwards.

In another embodiment, each of the main wings 104A, 104B can have an additional lifting propeller 109A, 109B, respectively, disposed at its distal end. This can be achieved by providing wing-tip vertical stabilizers 110A, 110B at the distal ends of the main wings 104A, 104B, respectively, and have the lifting propellers 109A, 109B disposed at the upper tip of each wing-tip vertical stabilizers 110A, 110B. These wing-tip lifting propellers 109A, 109B can be relatively smaller than the lifting propellers disposed on the linear supports 103A, 103B.

These wing-tip lifting propellers 109A, 109B can be used to effectively and efficiently control the roll of the drone 100. Being located at a most distal position away from the center axis of the drone 100, these wing-tip lifting propellers 109A, 109B are effective in adjusting the roll of drone 100, and can do so with a diameter smaller than that of other lifting propellers.

As shown further in FIG. 1, there is a cabin 130 generally attached under the main body 102 of the drone 100.

Figure 2:
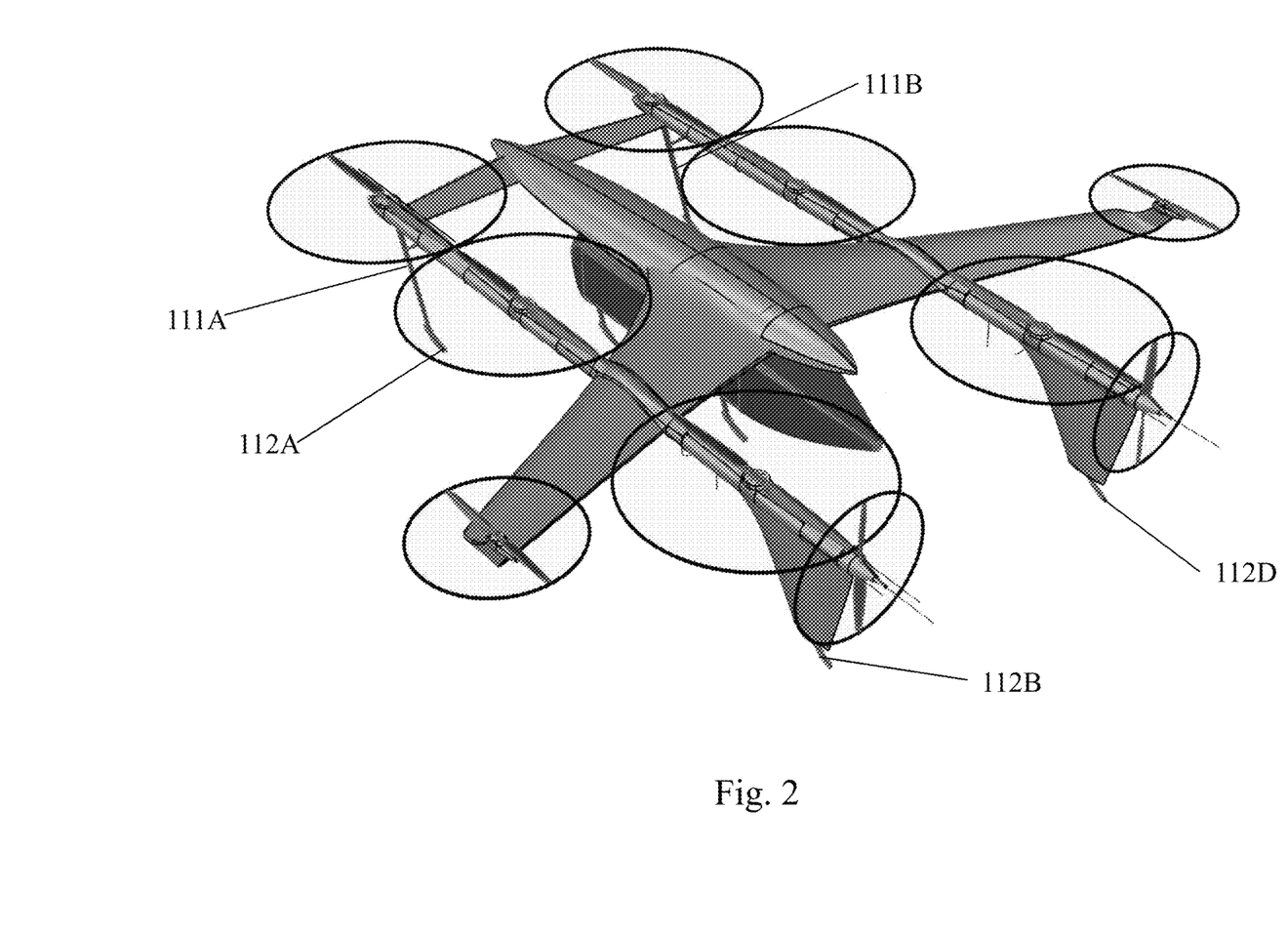
FIG. 2 is a top rear perspective view of the drone system of FIG. 1.

Referring now to the details of FIG. 2, the drone 100 is contemplated to use any type of landing gear. In one embodiment, the drone 100 can have four single-blade leaf springs 112A, 112B, 112C, 112D as its landing gear. The front two single-blade leaf springs 112A, 112C are respectively disposed on the distal ends of folding legs 111A, 111B. Folding legs 111A, 111B can be respectively retracted into the interior space of the left and right linear supports 103A, 103B during flight.

The rear two single-blade left springs 112B, 112D are contemplated to be disposed at the bottom distal ends of vertical stabilizers 106A, 106B, respectively.

The contemplated single-blade leaf springs 112A, 112B, 112C, 112D can be made of suitable materials to provide sufficient resiliency and integrity, such materials include natural and synthetic polymers, various metals and metal alloys, naturally occurring materials, textile fibers, and all reasonable combinations thereof. In one embodiment, carbon fiber is used.

Figure 3:
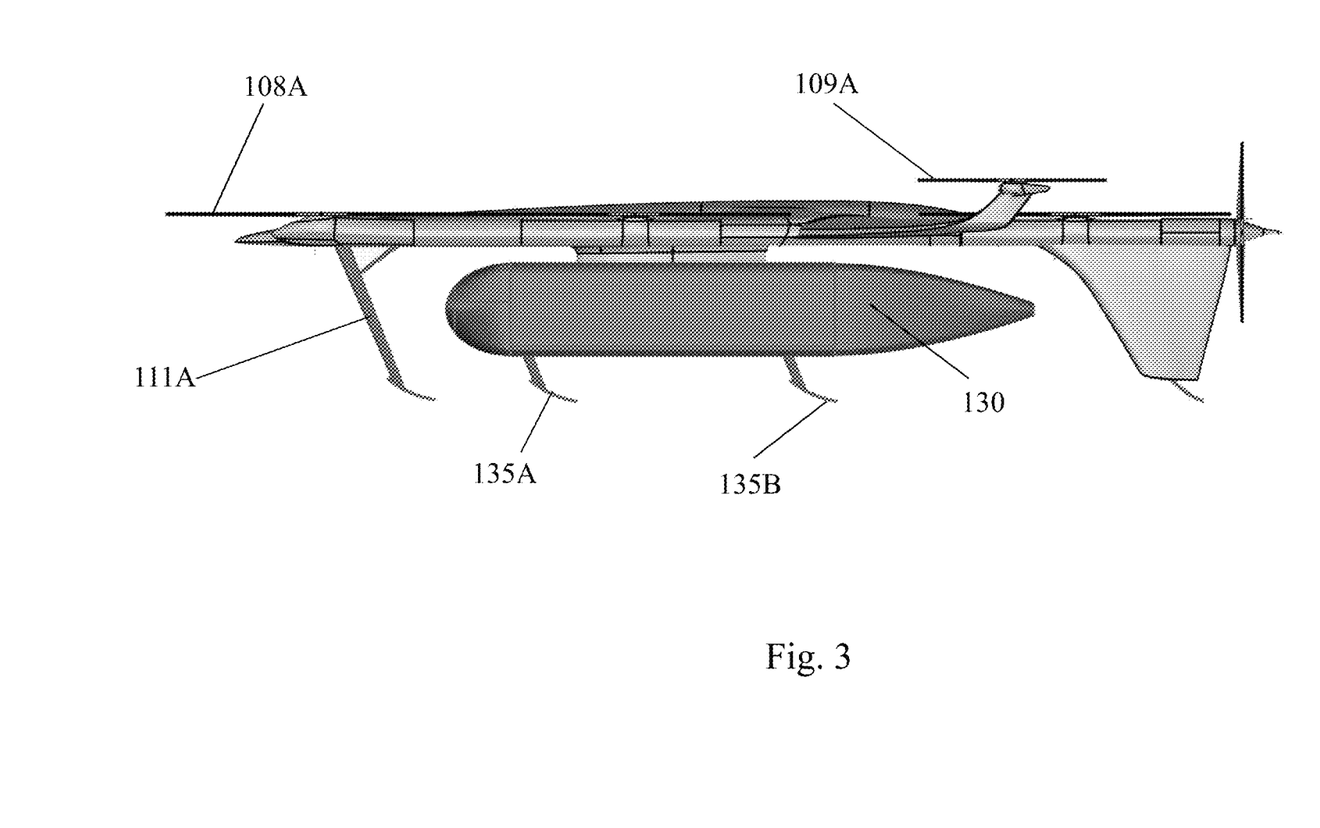
FIG. 3 is a side view of the drone system of FIG. 1.
Figure 4:
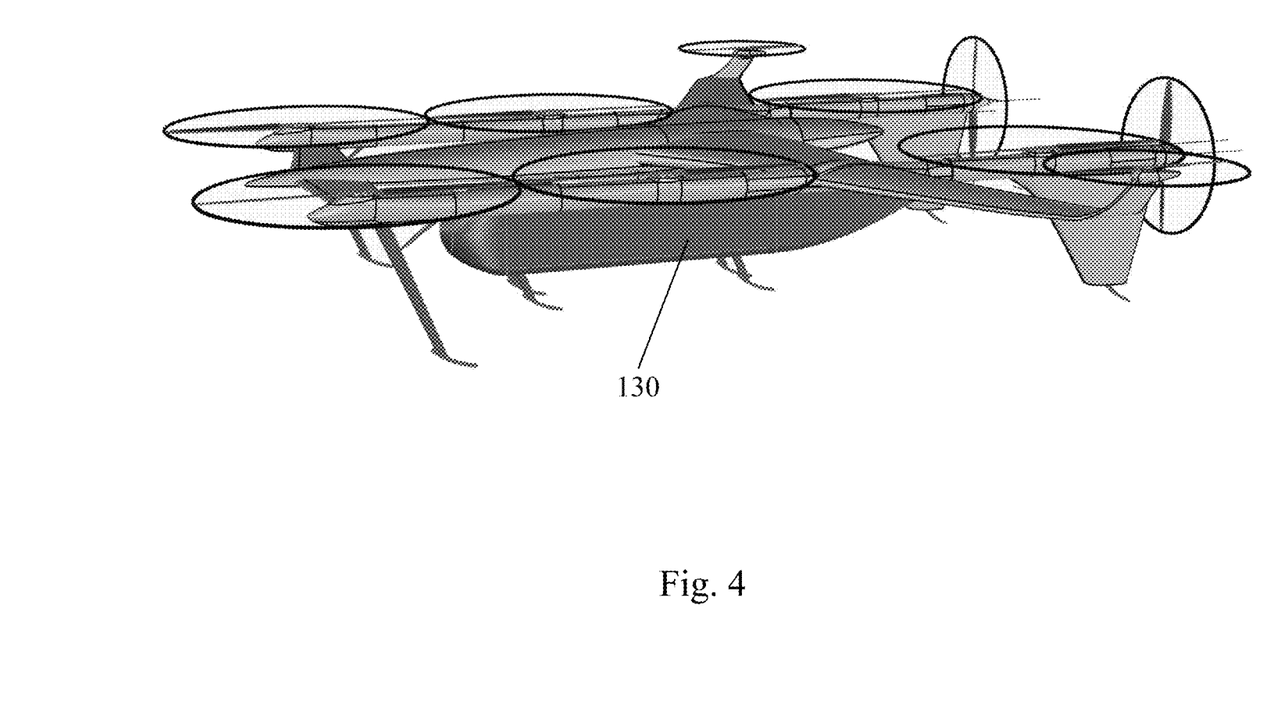
FIG. 4 is a top perspective view of another embodiment of a VTOL drone system having a flying platform and a cabin detachably attached, according to an aspect of the embodiment.

Turning now to FIG. 3, which shows the cabin as a cargo cabin 130. The cargo cabin 130 can have single-blade leaf springs 135A, 135B, 135C, 135D as its landing gear. Alternatively it can have other types of landing gear such as skids, leg stands, and wheels.

In the contemplated embodiments, the cargo cabin 130 is detachable from the rest of the drone 100. The remaining portion of the drone can be called a flying platform 101. The flying platform 101 can fly without carrying a cabin, and it can interchangeably carry different cabins. As will be described later, the flying platform 101 can also carry passenger cabins.

In the examples shown, all of the cabins 130, 140 are carried underneath the flying platform 101. Cabins 130, 140 are contemplated to be loaded on the ground, and the loading process can be done prior to or after the flying platform 101 is attached to the cabin 130, 140.

Figure 5:
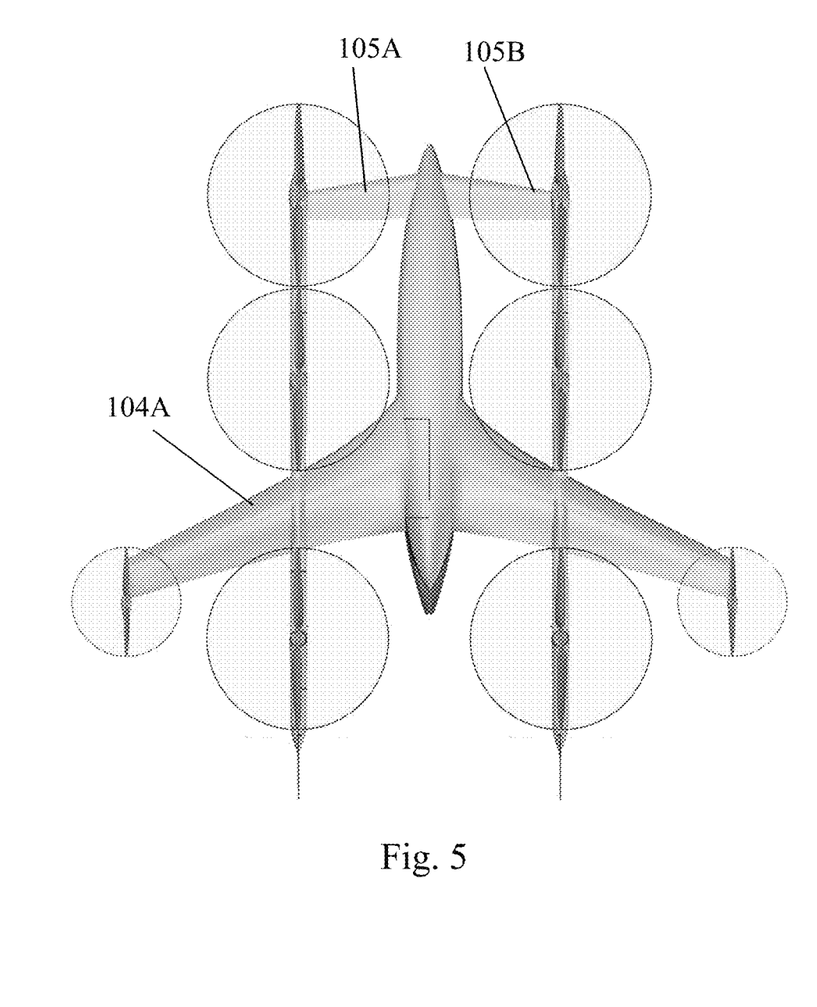
FIG. 5 is a top view of the drone system of FIG. 4, according to an aspect of the embodiment.

FIG. 5 shows a top view of the flying platform 101. It can have a generally flat configuration, capable of carrying a load underneath it, or above it. During high speed flying, all six lifting propellers 108A, 108B, 108C, 108D, 108E, 108F can be locked into position so each blade is parallel to the main body 102.

FIG. 5 shows one embodiment of the flying platform 101 where the canard wings 105A, 105B each has a length no longer than half the length of each of the main wings 104A, 104B.

Figure 6:
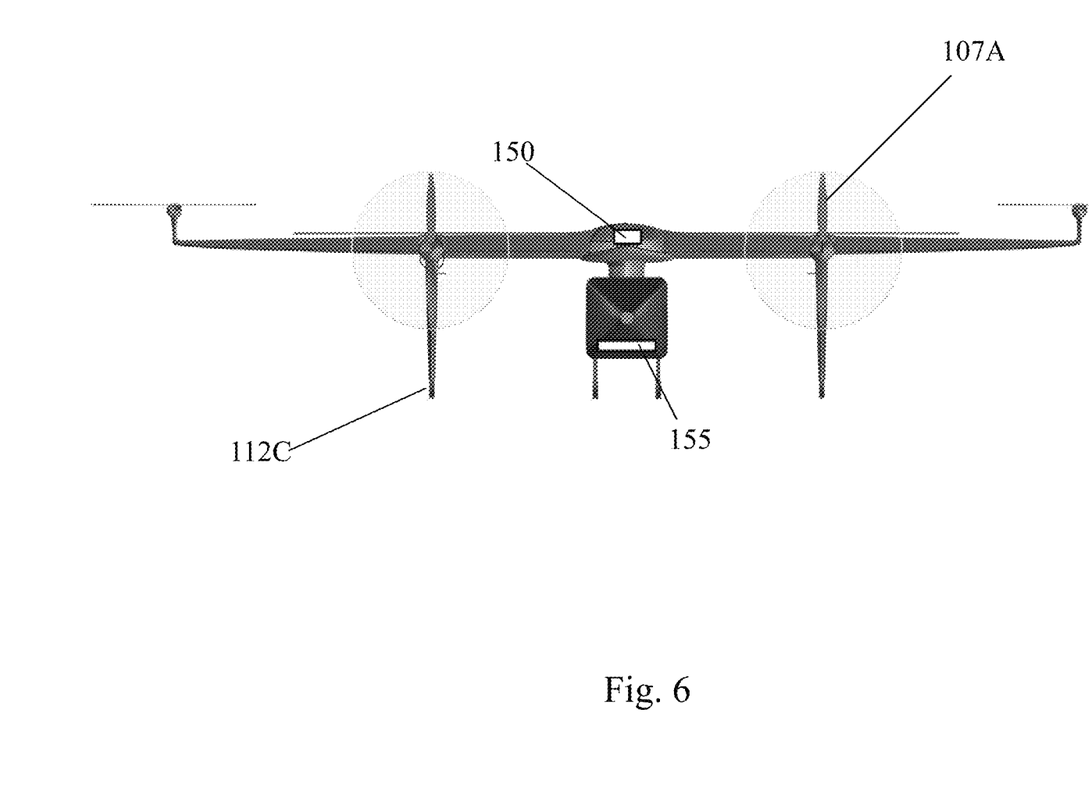
FIG. 6 is a front view of the drone system of FIG. 4, according to an aspect of the embodiment.

FIG. 6 generally depicts the frontal view of the flying platform 101 with a detachably attached cargo cabin 130. Whether it is a cargo cabin 130, passenger cabin 140, or any other types of load, it is especially contemplated that there can be an energy storage unit 150 disposed within the main body 102 of the flying platform. The energy stored can be used to power other components of the flying platform, such as the lifting propellers 108A, 108B, 108C, 108D and pushing propellers 107A, 107B. The energy stored can be electricity, and the storage unit is a battery. In another embodiment, this energy storage 150 can be used to power accessories within the cabin 130, 140.

These batteries 150 can also be disposed in other parts of the flying platform 101, such as within the linear supports 103A, 103B.

Alternatively or optionally, there can be an energy storage unit 155 disposed within the cabin 130, 140. The energy stored in storage unit 155 can be used to power the lifting propellers 108A, 108B, 108C, 108D and pushing propellers 107A, 107B. The energy stored can be electricity, and the storage unit is a battery. By having an energy storage unit 155 in the cabin 130, 140, the flying platform 101 would have replenished energy sources every time the flying platform 101 picks up a new cabin 130, 140. The flying platform 101 itself may be emergency energy storage, or a smaller capacity battery 150 necessary to power the flying platform 101 for shorter amount of time while it flies without a cabin 130, 140. In one embodiment, the main source of electricity for the flying platform 101 comes from battery 150 located in the cabin 130, 140. In this way, when the flying platform 101 swaps an old cabin 130, 140 out for a new cabin 130, 140, the flying platform 101 or the entire VTOL drone system 100 would have a fully charged energy source. This is a beneficial method that eliminates the need for a VTOL drone to charge itself. In a preferred embodiment, the flying platform 101 can work/fly continuously, picking up cargo cabin/passengers cabin, drop off cargo cabin/passengers cabin, for many hours, even days, without the need to stop for charging its battery.

Figure 7:
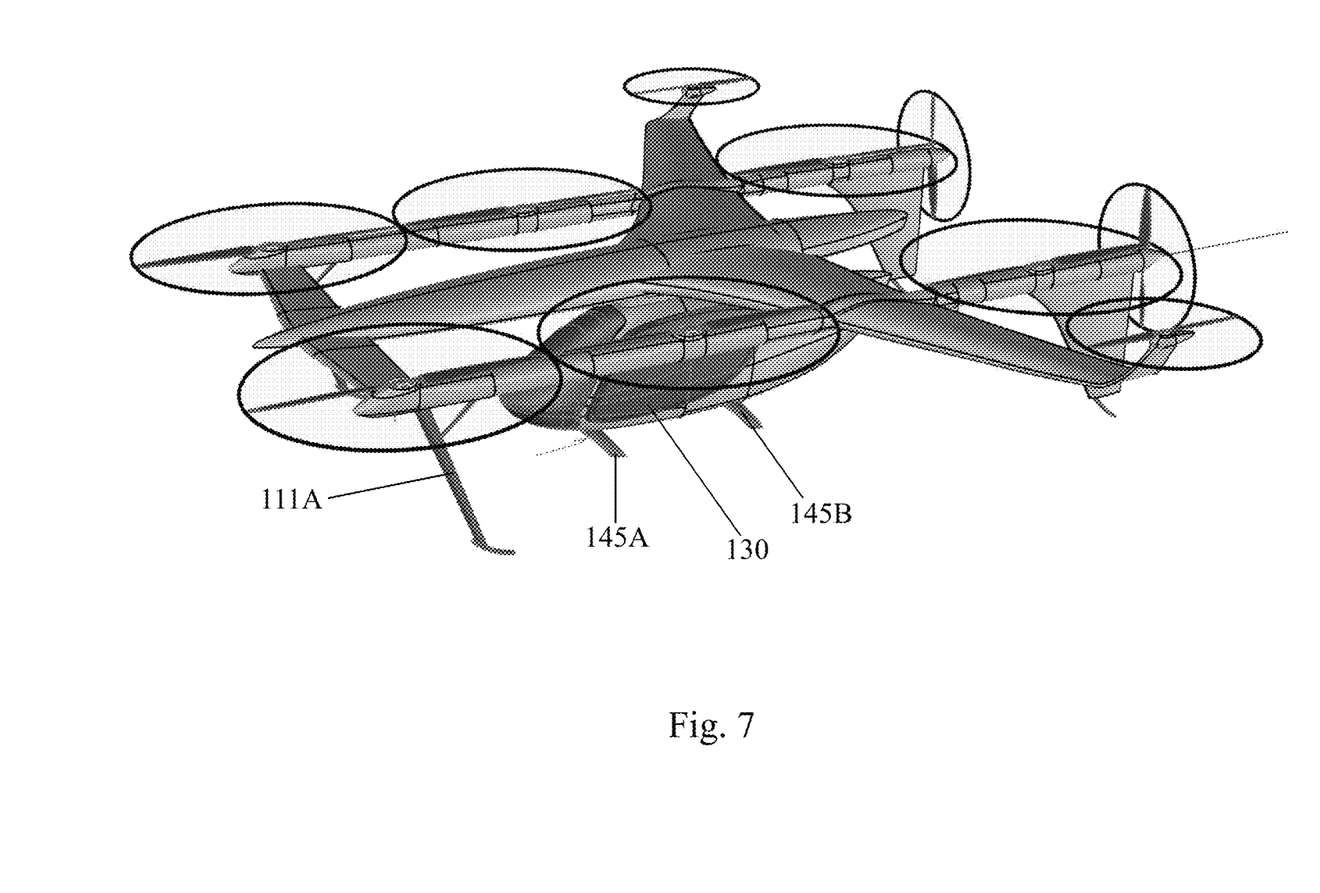
FIG. 7 is a top perspective view of an embodiment of a VTOL drone system having a flying platform and a passenger cabin detachably attached, according to an aspect of the embodiment.
Figure 8:
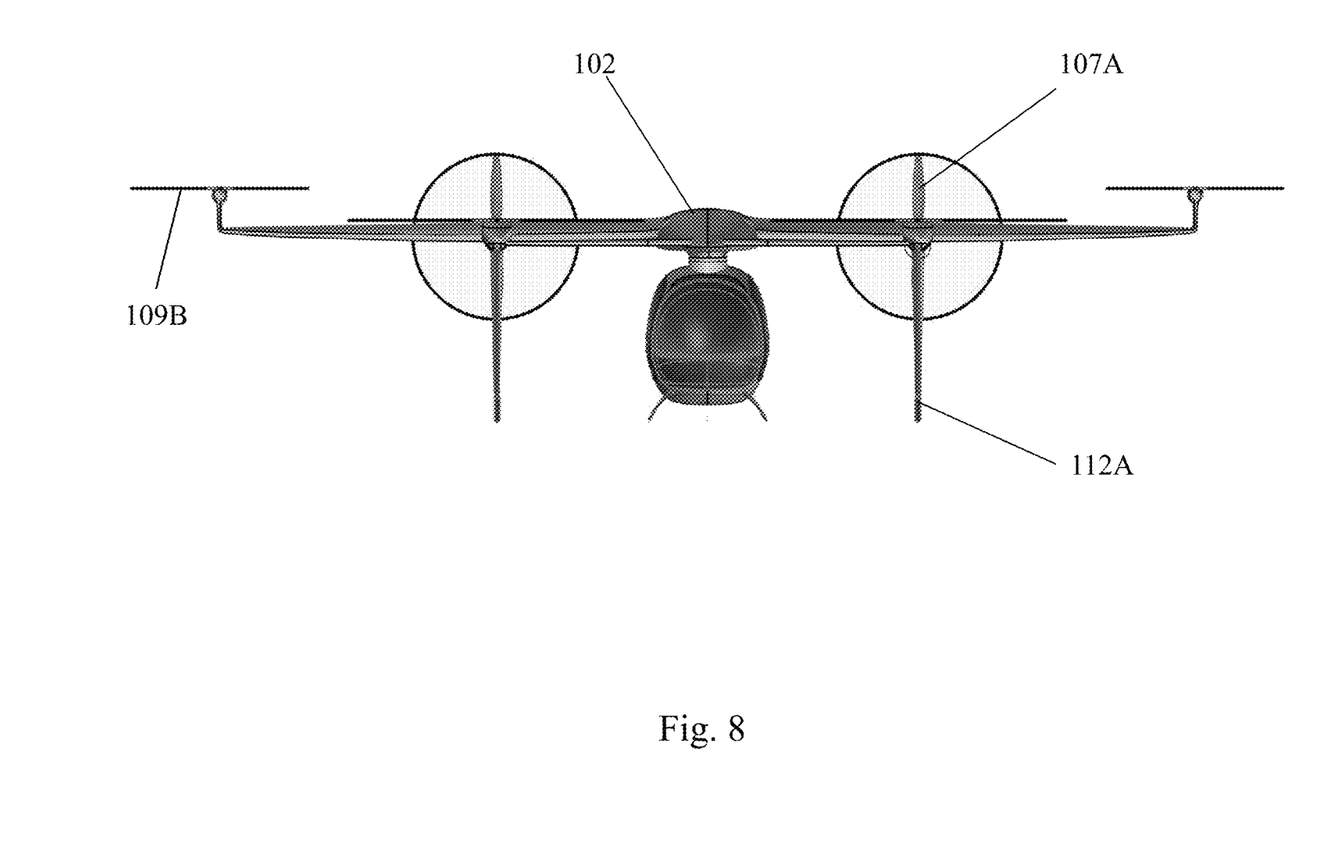
FIG. 8 is a front view of the drone system of FIG. 7, according to an aspect of the embodiment.
Figure 9:
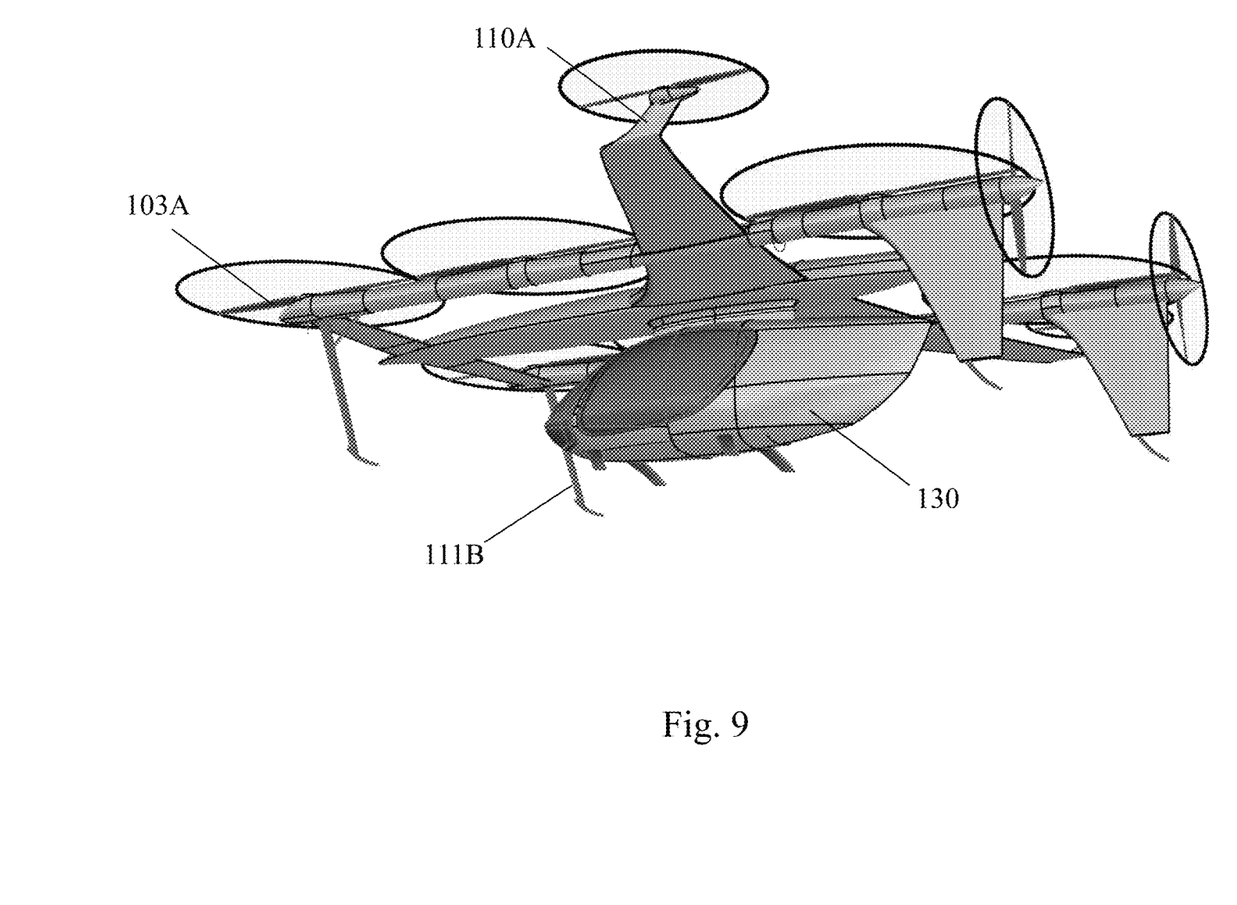
FIG. 9 is a rear perspective view of the drone system of FIG. 7, according to an aspect of the embodiment.

Referring now to the details of FIG. 7, a passenger cabin 150 is provided. This passenger cabin 150 can use any type of landing gear, such as stiff legs 145A, 145B, 145C, 145D as shown.

Figure 10:
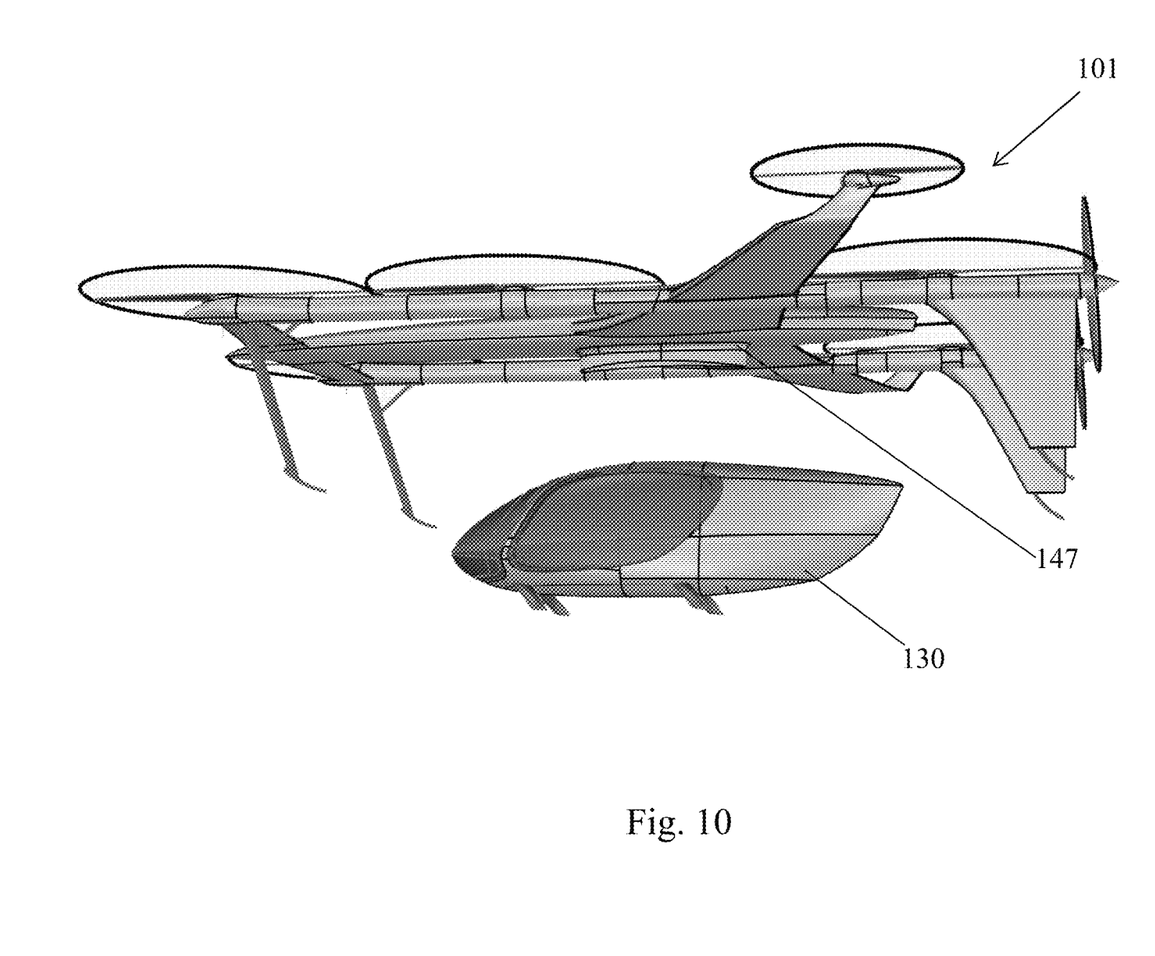
FIG. 10 is a rear perspective view of the drone system of FIG. 7 with the passenger cabin detached, according to an aspect of the embodiment.

FIG. 10 generally depicts one aspect of the disclosure where the cabin (whether cargo cabin or passenger cabin) is detachable. Here, passenger cabin 140 can be selectively detached from the flying platform 101. The engagement and disengagement between the flying platform 101 and the cabin 140 can be performed autonomously (without simultaneous user intervention) by a computer and/or other sensors and computing devices. Alternatively or optionally, the user can actively control and direct the engagement and disengagement between the flying platform 101 and the cabin 140.

As those of ordinary skill in the art will recognize, various different types of engaging mechanism 147 can be used to secure the cabin 140 to the flying platform 101. For example, the engaging mechanism can be mechanical catches, magnetic catches, tracks and grooves, or a combination of any known engagement means.

Figure 11:
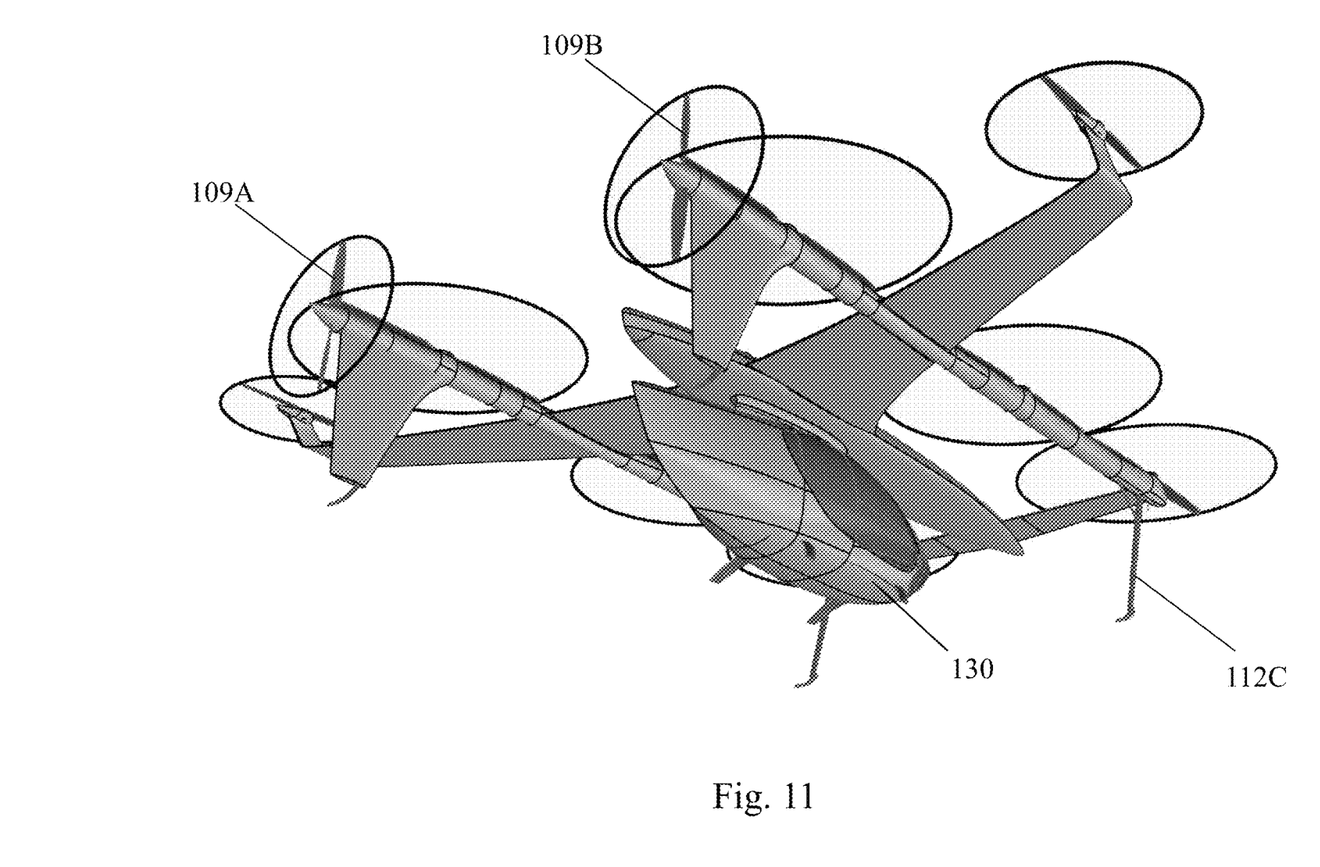
FIG. 11 is a rear perspective view of the drone system of FIG. 7, according to an aspect of the embodiment.
Figure 12:
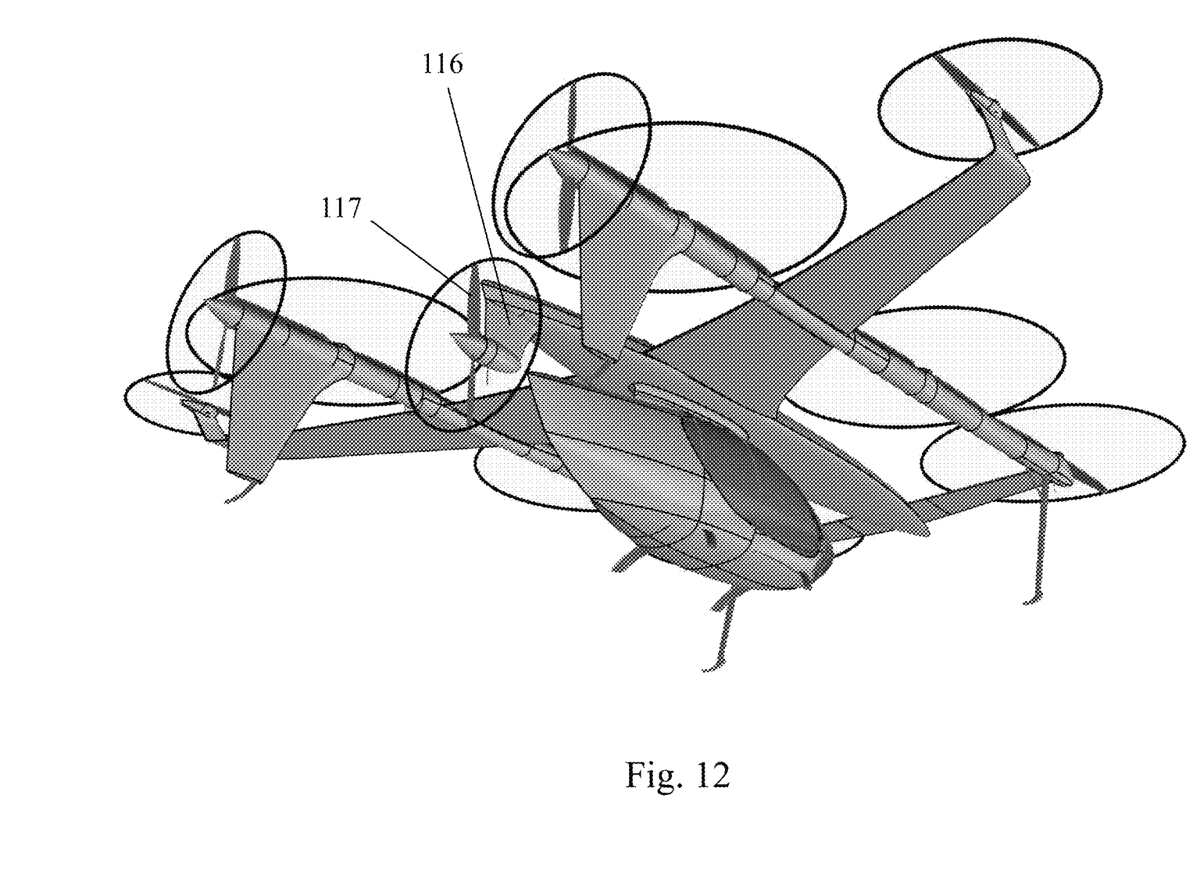
FIG. 12 is a rear perspective view of another embodiment, according to an aspect of the disclosure.

It is important to appreciate that besides having the two pushing propellers 107A and 107B (as shown in FIG. 11), alternatively or optionally, there can be a center pushing propeller 117 coupled to the rear end of the main body 102 (as shown in FIG. 12). As illustrated in FIG. 12, a center pushing propeller 117 is connected to the rear end of the main body 102 via a vertical extender 116. The vertical extender 116 can be any structure of any shape to physically couple to pushing propeller 117 such that the center of rotation for the pushing propeller 117 is vertically offset from the main body 102. In yet another embodiment, the pushing propeller 117 is vertically offset from the main body 102 such that the center of rotation for the pushing propeller 117 is vertically located at a position to the rear of the cabin 140, or vertically level with the cabin 140. In yet another embodiment, the pushing propeller 117 is vertically level with the top portion of the cabin 140. In still yet another embodiment, the pushing propeller 117 is vertically level with the middle portion of the cabin 140. In a further embodiment, the pushing propeller 117 is vertically level with the bottom portion of the cabin 140.

Not shown in any of the figures is an embodiment where there are no pushing propellers 107A, 107B at the end of the linear supports 103A, 103B, respectively. Instead, there can only be one pushing propeller 117 coupled to the rear end of the main body 102.

Figure 13:
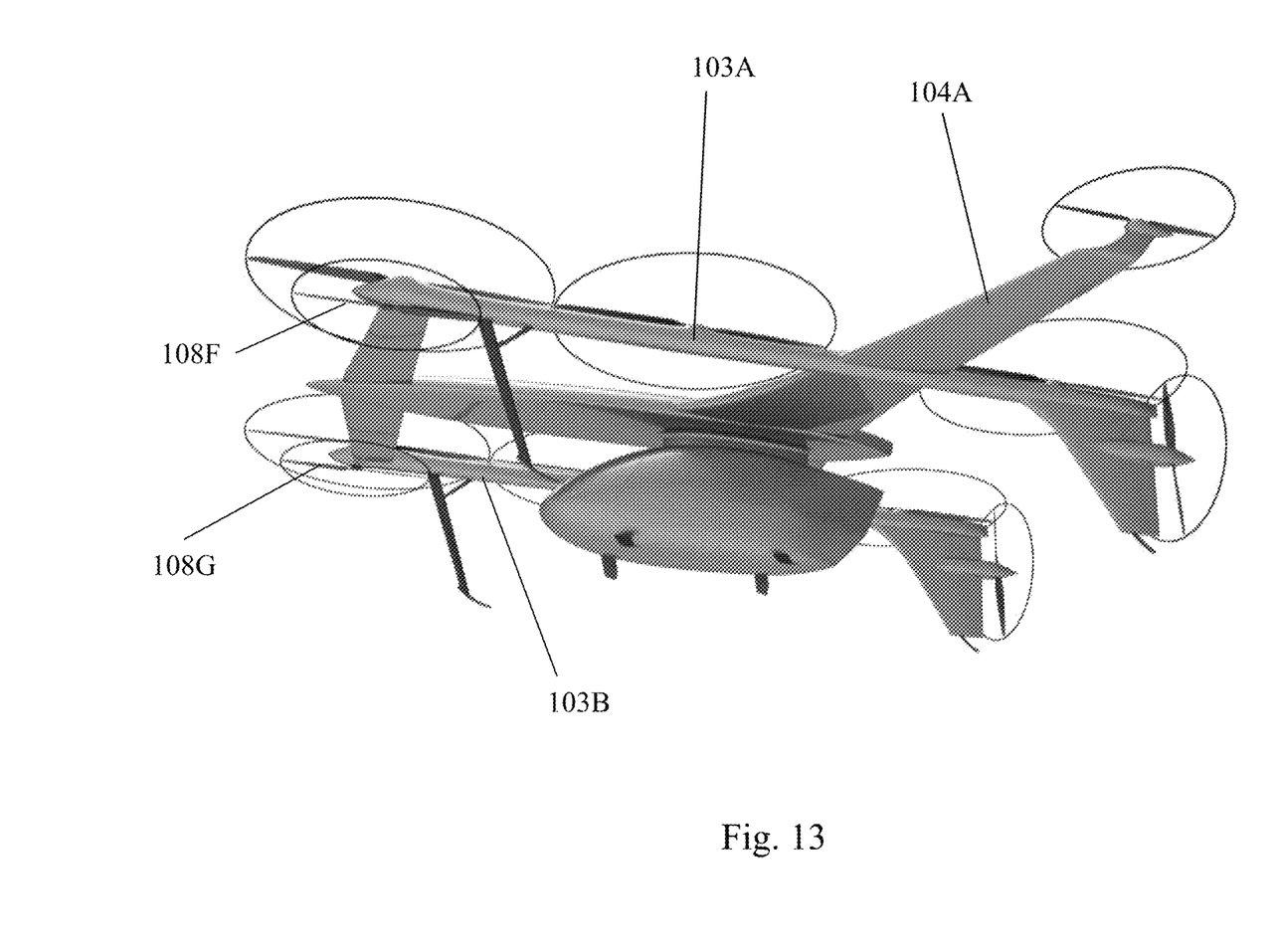
FIG. 13 is a side bottom perspective view of still yet another embodiment of the drone system, according to an aspect of the embodiment.

It is also contemplated that each linear support 103A, 103B can contain more than three lifting propellers by providing a longer linear support to contain more lifting propellers, by using smaller diameter lifting propellers, or by placing lifting propellers on both the top side and the bottom side of the linear support. FIG. 13 shows one embodiment where two additional lifting propellers 108G, 108H are provided at the bottom front ends of linear support 103A, 103B.

While the pushing propellers 107A, 107B has been shown in previous figures to locate at the rear distal ends of the linear supports 103A, 103B, it is specifically contemplated that these pushing propellers 107A, 107B can be disposed at a horizontal level that is lower than the main wings 104A, 104B such as those shown in FIG. 13. In one aspect, these pushing propellers 107A, 107B can be disposed at a horizontal level substantially equal to the horizontal level of the cabin 130, 140 being carried by the flying platform 101. In another aspect, these pushing propellers 107A, 107B can be disposed about mid-way down the vertical stabilizers 106A, 106B. One contemplated reason to lower the disposition of the pushing propellers 107A, 107B is to minimize a head-dipping effect during flight, which can be caused by aerodynamic effects caused by the cabin 130, 140.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of VTOL flying platform with interchangeable cabins have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

What is claimed is:

1. A VTOL (vertical take-off and landing) aerial drone having interchangeable cabins, the aerial drone comprising:
    a flying platform having:
        a left main wing and a right main wing;
        a left canard wing and a right canard wing;
        a main body disposed between the left main wing and the right main wing;
        a left linear support connecting the left main wing to the left canard wing;
        a right linear support connecting the right main wing to the right canard wing;
        the left linear support has a first, a second, a third lifting propellers, and a left vertical stabilizer;
        the right linear support has a fourth, a fifth, a sixth lifting propellers and a right vertical stabilizer;
        at least one pushing propeller;
        a folding leg retrievable with in the left linear support and a landing gear disposed at a distal end of said folding leg;
    a cargo cabin or a passenger cabin being detachably coupled to the flying platform.

2. The aerial drone as recited in claim 1 further comprising an energy storage unit disposed in the cargo cabin and the passenger cabin to supply energy to the flying platform.

3. The aerial drone as recited in claim 1 further comprising a hybrid engine to produce electricity.

4. The aerial drone as recited in claim 1 the further comprising a left wing-tip propeller disposed on the distal end of the left main wing, and a right wing-tip propeller disposed on the distal end of the right main wing.

5. The aerial drone as recited in claim 1, wherein the at least one pushing propeller is disposed so as to be horizontally level with the cargo cabin or the passenger cabin.

6. The aerial drone as recited in claim 5, wherein the at least one pushing propeller includes a left pushing propeller disposed in a mid-section of the left vertical stabilizer, and a right pushing propeller disposed in a mid-section of the right vertical stabilizer.

7. The aerial drone as recited in claim 5, wherein the at least one pushing propeller is coupled to a rear end of the main body and is extended downward away from the main body.

8. The aerial drone as recited in claim 1, wherein the passenger cabin and the cargo cabin can be detachably attached to the bottom of the flying platform.

9. The aerial drone as recited in claim 1, wherein the landing gear is a single-blade leaf spring.

10. The aerial drone as recited in claim 1 further comprising another landing gear disposed at the distal end of the left vertical stabilizer.

* * * * *